(12) United States Patent
Heile

(10) Patent No.: US 6,317,860 B1
(45) Date of Patent: Nov. 13, 2001

(54) ELECTRONIC DESIGN AUTOMATION TOOL FOR DISPLAY OF DESIGN PROFILE

(75) Inventor: Francis B. Heile, Santa Clara, CA (US)

(73) Assignee: Altera Corporation, CA (US)

( * ) Notice: Subject to any disclaimer, the term of this patent is extended or adjusted under 35 U.S.C. 154(b) by 0 days.

(21) Appl. No.: 08/958,431

(22) Filed: Oct. 27, 1997

Related U.S. Application Data

(60) Provisional application No. 60/029,277, filed on Oct. 28, 1996.

(51) Int. Cl.⁷ ............................................ G06F 17/50
(52) U.S. Cl. ............................................................. 716/5
(58) Field of Search ........................ 395/500.11, 500.19; 714/8; 716/5

(56) References Cited

U.S. PATENT DOCUMENTS

| | | | |
|---|---|---|---|
| 5,050,091 | * 9/1991 | Rubin | 395/500.11 |
| 5,499,192 | 3/1996 | Knapp et al. | 364/489 |
| 5,513,124 | 4/1996 | Trimberger et al. | 364/491 |
| 5,661,660 | 8/1997 | Freidin | 364/489 |
| 5,691,912 | 11/1997 | Duncan | 364/490 |
| 5,696,454 | 12/1997 | Trimberger | 326/38 |
| 5,727,187 | * 3/1998 | Lemchi | 395/500.19 |
| 5,812,561 | * 9/1998 | Giles | 714/8 |
| 5,937,190 | * 10/1999 | Gregory | 714/4 |

OTHER PUBLICATIONS

"RTL Analyzer," Synopsys, Inc. (www.synopsys.com), Oct. 6, 1997, 2 pages.

"RTL Analyzer: The First RTL Performance Debugger," Synopsys, Inc. (www.synopsys.com), Oct. 13, 1997, 2 pages.

Re–Engineering High–Performance ASICs at Sun Microsystems Using RTL Analyzer, Synopsys, Inc (www.synopsys.com), Oct. 13, 1997, 4 pages.

"RTL Analyzer in Print," Synopsys, Inc. (www.synopsys.com), Oct. 13, 1997, 1 page.

"Improving the Quality of Source with RTL Analyzer The Best Way to Solve HDL Performance Problem," Synopsys, Inc. (www.synopsys.com), Oct. 13, 1997, 3 pages.

(List continued on next page.)

*Primary Examiner*—Matthew Smith
*Assistant Examiner*—Thuan Do

(57) ABSTRACT

A technique accurately calculates utilization information for an electronic design to help optimize the design. After synthesis of the complete design, information including number of combinatorial logic cells, maximum number of levels of combinatorial logic cells, number of registered logic cells, and number of latch logic cells for each line of source code is displayed. The information is in a source file text editor or in a graphic editor. The technique maps back from logic cells to technology-independent gates and back to lines of source code taking into account synthesized logic cells, and displays how many logic cells a line of source code is responsible for producing. For post-synthesis netlists having no synthesized logic cells, gates are grouped according to which logic cell they correspond. For netlists with synthesized logic cells, regions of logic cells within the netlist are first identified. Starting from a non-synthesized logic cell, its inputs are traversed upstream to form a region of logic cells until either an input pin is reached or another non-synthesized logic cell is reached. Regions may overlap. Synthesized logic cells within more than one region contribute a fraction to each region. Next, regions of gates are identified in the gate-level netlist that correspond to each region of logic cells. Logic cells of each region are distributed among gates of the corresponding region. Logic cells are counted for a line of source code by identifying to which gates the line corresponds and summing the logic cells for those gates.

44 Claims, 6 Drawing Sheets

OTHER PUBLICATIONS

"RTL Analyzer: Faster Source×Faster Designs," Synopsys, Inc. (www.synopsys.com), Oct. 13, 1997, 2 pages.

"RTL Analyzer: Arithmetic Logic Application," Synopsys, Inc. (www.synopsys.com), Oct. 13, 1977, 2 pages.

"RTL Analyzer: Datapath Controller Application," Synopsys, Inc. (www.synopsys.com), Oct. 13, 1997, 2 pages.

"RTL Analyzer: FPGA Prototype Application," Synopsys, Inc. (www.synopsys.com), Oct. 13, 1997, 2 pages.

"RTL Analyzer: System Controller Application" Synopsys, Inc. (www.synopsys.com), Oct. 13, 1997, 2 pages.

Design Compiler Family: Industry–Standard Logic Synthesis Solutions, Synopsys, Inc. (www.synopsys.com), Oct. 13, 1997, 2 pages.

"Design Analyzer Datasheet," Synopsys, Inc. (www.synopsys.com), Oct. 13, 1997, 2 pages.

* cited by examiner

ELECTRONIC DESIGN AUTOMATION TOOL FOR DISPLAY OF DESIGN PROFILE

This application claims priority of provisional U.S. patent application Ser. No. 60/029,277, filed Oct. 28, 1996, entitled "Tools For Designing Programmable Logic Devices" which is incorporated by reference.

The present application is related to the following applications filed on the same date herewith: U.S. patent application Ser. No. 08/958,002, naming B. Pedersen et al. as inventors, entitled "Generation Of Sub-Net Lists For Use In Incremental Compilation"; U.S. patent application Ser. No. 08/958,436, naming J. Tse et al. as inventors, entitled "Fitting For Incremental Compilation Of Electronic Designs"; U.S. patent application Ser. No. 08/958,670, naming D. Mendel as inventor, entitled "Parallel Processing For Computer Assisted Design Of Electronic Devices"; U.S. patent application Ser. No. 08/958,626, naming F. Heile et al. as inventors, entitled "Interface For Compiling Design Variations In Electronic Design Environments"; U.S. patent application Ser. No. 08/958,778, naming T. Southgate as inventor, entitled "Method And Apparatus For Automated Circuit Design"; U.S. patent application Ser. No. 08/958,434, naming T. Southgate et al. as inventors, entitled "Graphic Editor For Block Diagram Level Design Of Circuits"; U.S. patent application Ser. No. 08/958,432, naming T. Southgate et al. as inventors, entitled "Design File Templates For Implementation Of Logic Designs"; U.S. patent application Ser. No. 08/958,414, naming T. Southgate as inventor, entitled "Method For Providing Remote Software Technical Support"; U.S. patent application Ser. No. 08/958,777, naming T. Southgate as inventor, entitled "Method For Simulating A Circuit Design"; U.S. patent application Ser. No. 08/957,957, naming F. Heile et al. as inventors, entitled "Workgroup Computing For Electronic Design Automation"; U.S. patent application Ser. No. 08/958,798, naming F. Heile as inventor, entitled "Local Compilation In Context Within A Design Hierarchy"; and U.S. patent application Ser. No. 08/958,798, naming Alan L. Herrmann et al. as inventors, entitled "Embedded Logic Analyzer For A Programmable Logic Device". The above related applications are incorporated herein by reference in their entireties for all purposes.

FIELD OF THE INVENTION

The present invention relates generally to an electronic design automation tool for use on a computer system. More specifically, the present invention relates to a technique for calculating utilization information in order to optimize an electronic design.

BACKGROUND OF THE INVENTION

In the field of electronics, various electronic design automation (EDA) tools are useful for automating the process by which integrated circuits, multi-chip modules, boards, etc., are designed and manufactured. In particular, electronic design automation tools are useful in the design of standard integrated circuits, custom integrated circuits (e.g., ASICs), and in the design of custom configurations for programmable integrated circuits. Integrated circuits that may be programmable by a customer to produce a custom design for that customer include programmable logic devices (PLDs). Programmable logic devices refer to any integrated circuit that may be programmed to perform a desired function and include programmable logic arrays (PLAs), programmable array logic (PAL), field programmable gate arrays (FPGA), complex programmable logic devices (CPLDs), and a wide variety of other logic and memory devices that may be programmed. Often, such PLDs are designed and programmed by an engineer using an electronic design automation (EDA) tool that takes the form of a software package.

Such an EDA tool is used to create source files having lines of source code that together specify a design to be programmed into a PLD. A given line of source code in a design file may produce many flip-flops, latches, or other gates. A line may also call a sub-function that in turn generates a number of logic elements. It is also possible that a line such as a flow control statement would not generate any logic elements. Knowledge of how many logic elements a given line of source code is generating is extremely useful to a designer. Once a designer knows which line of source code is generating the most logic elements or levels of logic (creating a greater timing delay), the designer may then attempt to optimize that line of source code.

More specifically, it is useful for a user creating a design for a PLD to know the area the design will occupy, the speed of the design, and how many memory elements the design will need. Area may be indicated by estimating a gate count, speed can be estimated by levels of gates a signal passes through, and memory elements estimated by counting numbers of flip-flops and latches required. This utilization information can help a designer in optimizing his or her design.

For example, it is also desirable to know how many flip-flops, latches or other memory elements the design will require. Often, certain ways of writing source code in a design language, or errors in the code may result in extra, unwanted memory elements. For a PLD with space constraints, unneeded memory elements are a problem. For example, the source statement "If A then B=C" would generate a latch because if A fails then B must hold its value. By contrast, the statement "If A then B=C, else B=D" would not generate a latch because the value of B always changes. If a user neglects to add an "else" clause (such as at the end of a long string of clauses), or does not use one when he could, extra latches would be generated.

Similarly, extra flip-flops may also be generated unbeknownst to the user. For example, in VHDL the following statements in a process block will generate only one flip-flop: if (clk' event and clk='1') then g:=f and c; c:=g; end if;. In these statements, c will become a flip-flop whereas g will not be flip-flop since it is read only after it is written to. This can be a surprise to the designer since subtle differences in where variable values are read or written determines which variables become flip-flops. Also in VHDL, latches may be inadvertently created by not assigning a value to a variable in every if/then/elseif/else section.

One software tool called "HDL Critic" available from Synopsys of Mountain View, Calif. is able to estimate number of gates for a design, flip-flops, and latches. (Other products called "HDL Advisor" and "RTL Analyzer" may also include this functionality.) Because the compiler available from Synopsys can take many hours to perform a synthesis, the HDL Critic tool does not perform its analysis during compilation (which would take a long time to get results), but is a separate module that analyzes a source file. It then displays estimated number of gates for each line of source code. However, because HDL Critic looks at a source file before compilation, and does not perform analysis during a compilation of the complete design, it is not as accurate as it could be.

HDL Critic is also able to produce information such as number of logic cells, number of levels, number of logic cells with flip-flops and latches, but performs this analysis after compilation. HDL Critic performs this analysis by using a "back annotation" command after a compile has completed. However, this analysis is not part of a compile.

Other difficulties exist with producing such utilization information. For example, in certain situations logic cells are produced during the synthesis stage of a compilation that do not correspond to any gate in the post-extraction netlist. In other words, there is no output gate that corresponds to the output of these logic cells. These are termed "synthesized" logic cells.

Because these cells are "synthesized" during synthesis, and do not correspond directly back to gates in the post-extraction netlist, it can be difficult to determine the corresponding lines of source code. By contrast, logic cells that have corresponding gates in the post-extraction netlist can be associated with lines of source code because these gates can be traced back to the lines of source code that produced them. As these synthesized logic cells still take up space in a PLD, it is important to take these cells into account when producing utilization information such as total number of logic cells produced by a line of source code, maximum path length through logic cells for a line of source code, etc.

Therefore, it would be desirable to have a technique and system by which utilization information for a PLD design is calculated accurately within the context of the complete PLD design and produces an accurate design profile for display to a user.

SUMMARY OF THE INVENTION

To achieve the foregoing, and in accordance with the purpose of the present invention, a technique of creating a design profile is disclosed that accurately calculates design profile information during compilation of a design.

The present invention performs analysis of a design during a compilation and preferably after synthesis. After synthesis of the complete design, and within the context of the complete design, the present invention displays utilization information such as number of combinatorial logic cells, maximum number of levels of combinatorial logic cells, number of registered logic cells, number of latch logic cells, etc.

This utilization information is displayed together with the contents of a design file. For example, the information may be displayed in source file editors and in a compiler tool hierarchy tree. In a graphic editor, the information may be displayed near each symbol. In a text editor, it may be displayed in columns to the right (or left) of each line of source code (such as AHDL, VHDL, Verilog, etc.). Thus, these profile results apply to either a graphic or a text editor.

In one specific embodiment of the present invention, elements of a design known as "logic cells" are analyzed to provide a total count, speed estimates, memory requirements, etc. Logic cells are created after synthesis and therefore are technology-dependent elements that are mapped to a particular device to be programmed with the design. Unlike a gate count, speed estimate or count of flip-flops before compilation, because logic cells are created after synthesis and are technology-dependent, they present a much more accurate estimate of design area, design speed, and memory requirements. Furthermore, because the present invention performs a profile analysis during a compilation of the entire design, much more accurate profile information is obtained. For example, if a bus width contains a variable number of bits within a given source file, this bus width variable may not be able to be resolved by reference to just the given source file. But within the context of the complete compiled design, this variable is available.

In one specific embodiment of the invention, the utilization information provided includes the number of logic cells (giving area), the maximum number of levels of logic cells (giving a speed estimate), the number of "registered" logic cells (those logic cells using a flip-flop—giving a memory estimate), and the number of "latch" logic cells (also giving a memory estimate). By providing this utilization information line-by-line for a source code file, a user is presented with a detailed profile of his design enabling him to optimize the design.

The number of logic cells can be counted after synthesis and provides the number of logic cells generated by each line of source code. This number can show areas of the design that generate more logic than the user might have expected. The maximum number of levels of logic cells is a count of the number of cells along the longest signal path in the generated logic for each source file line or entity and can give a preliminary indication of the performance bottlenecks in a design. The number of registered logic cells and the number of latch logic cells can show problems where the user's coding style or coding errors have generated extra unintended registers or latches (a common problem in either VHDL or Verilog).

Other timing information may also be calculated and displayed such as actual timing calculation results for a full compile netlist. For example, for any line of a design that has registers, the actual F(max) (maximum frequency at which the registers can be clocked) of the registers may be displayed. Also, the minimum T(pd) (time delay from input to output) may be displayed in addition to displaying the maximum number of levels of logic cells. This T(pd) value would be the computed delay for logic cell inputs to logic cell outputs for the network of logic cells generated for each line of source code (or for an entity). When carry or cascade chains are used, this time delay is not necessarily proportional to the number of levels of logic cells.

This utilization information is available from the compiler database and is updated automatically when the design is compiled. For an instantiation of an entity, the information displayed includes all of the logic contained in the child entity and all grandchildren entities below that child entity. In addition to being displayed in source files, the utilization information is also displayed for every instance of every entity in the compiler tool's hierarchy display.

Furthermore, summary information is provided for each user defined block of statements in the source design file. For example, in VHDL, a process is typically a block of sequential statements, therefore, in addition to giving information for each individual statement in the process block, summary information for the whole block is provided. For certain quantities, the process block numbers may be calculated by summing all of the corresponding numbers for the lines in the block. For the quantity number of levels of logic cells, it is computed separately for the block because all of the combinatorial logic for all of the statements in the block are merged before the number of levels for the entire block can be calculated.

In one specific embodiment of the invention, a technique is presented to take into account synthesized logic cells produced after synthesis when determining utilization information for each line of a source file. This mapping from synthesized logic cells produced by a design back to particular lines in a source file allows a designer to accurately determine which lines of a source file are producing extra logic cells or additional levels of logic cells. In this embodiment, the technique provides a mapping from all logic cells (including logic cells having corresponding gates as well as synthesized logic cells) back to technology-independent gates such as Assignment Decision Diagram (ADD) gates (used by Altera Corporation), Gtech (general technology) gates (used by Synopsys), or other simple logic gates. These gates in turn provide a mapping back to individual lines of source code.

Unlike other techniques for mapping logic cells to technology-independent gates that may create, maintain, and merge enormous lists during compilation that slows down the synthesis process, the technique presented is extremely efficient. Other techniques that keep track of relationships between logic cells and technology-independent gates as you go (i.e., during compilation) are naively simplistic and slow down compilation greatly. The technique presented is a fast way of mapping from logic cells to technology-independent gates and takes into account synthesized logic cells, thus providing better feedback to a designer concerning how many logic cells a line of source code is responsible for producing.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

In order to develop a design for programming an electronic design such as a programmable logic device (PLD), a programmable logic development system is used. As used herein, "electronic design" refers to circuit boards and systems including multiple electronic devices and multi-chip modules, as well as integrated circuits. For convenience, the following discussion will generally refer to "integrated circuits", or to "PLDs", although the invention is not so limited.

Embodiments of the present invention allow a designer to view utilization information for each line of source code in an electronic design source file. This utilization information includes percentage of gates used, number of logic cells, etc., per line of source code. In another embodiment, the present invention annotates a schematic representation of a source file instead of lines of source code. Each symbol in the schematic representation would represent a line or multiple lines of source code. In this embodiment, each symbol would be annotated with number corresponding to the utilization information. For simplicity of reading, however, the following description will refer to annotation of lines of source code, although the invention is not so limited. Before flowcharts describing an embodiment of the present invention are described, a general system and design methodology that may be used are described.

Programmable Logic Development System

Figure 1:
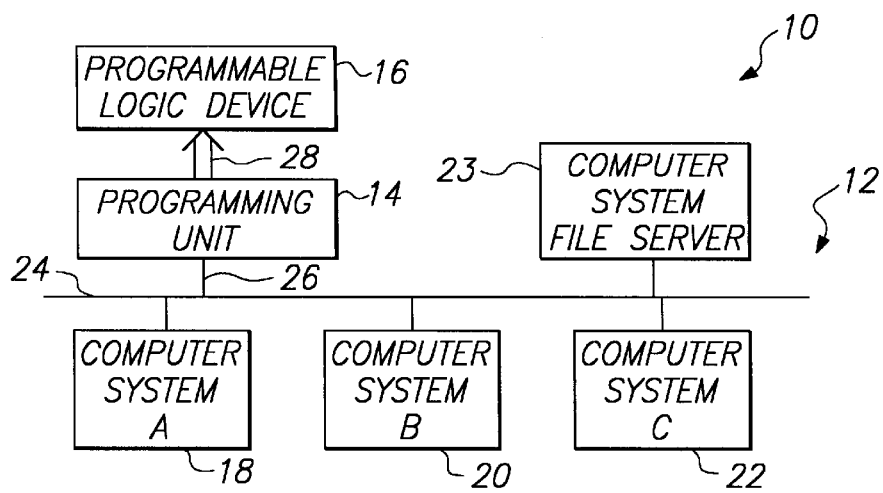
FIG. 1 is a block diagram of a programmable logic development system according to one embodiment of the present invention.

FIG. 1 is a block diagram of an embodiment of a programmable logic development system 10 that includes a computer network 12, a programming unit 14 and a programmable logic device 16 that is to be programmed. Computer network 12 includes any number of computers connected in a network such as computer system A 18, computer system B 20, computer system C 22 and computer system file server 23 all connected together through a network connection 24. Computer network 12 is connected via a cable 26 to programming unit 14, which in turn is connected via a programming cable 28 to the PLD 16. Alternatively, only one computer system could be directly connected to programming unit 14. Furthermore, computer network 12 need not be connected to programming unit 14 at all times, such as when a design is being developed, but could be connected only when PLD 16 is to be programmed.

Programming unit 14 may be any suitable hardware programming unit that accepts program instructions from computer network 12 in order to program PLD 16. By way of example, programming unit 14 may include an add-on logic programmer card for a computer, and a master programming unit, such as are available from Altera Corporation of San Jose, Calif. PLD 16 may be present in a system or in a programming station. In operation, any number of engineers use computer network 12 in order to develop programming instructions using an electronic design automation software tool. Once a design has been developed and entered by the engineers, the design is compiled and verified before being downloaded to the programming unit. The programming unit 14 is then able to use the downloaded design in order to program PLD 16.

Such a programmable logic development system is used to create an electronic design. Design entry and processing occurs in the context of a "project". A project includes a project file, design files, assignment files, and simulation files, together with hierarchy information, system settings, and output files, which includes programming files and report files. A project database may also exist, which contains intermediate data structures and version information.

A project contains one or more hierarchies of design entities and each design hierarchy tree has a root entity, which is the topmost design entity in that hierarchy tree (the top-level functional block). Other design entities in the design hierarchy tree are called child entities. Also, a design hierarchy may contain entities for which there is no corresponding design file, for example, in a top-down design methodology. That part of a hierarchy which contains such not-yet-implemented entities is not compiled or simulated until a design file is supplied for each entity. In this case, template source files are automatically generated which have defined interfaces but empty bodies to assist in implementing these parts of a project. A user creates a design by specifying and implementing functional blocks, as will now be described in the context of an exemplary design methodology.

Design Methodology

Figure 2:
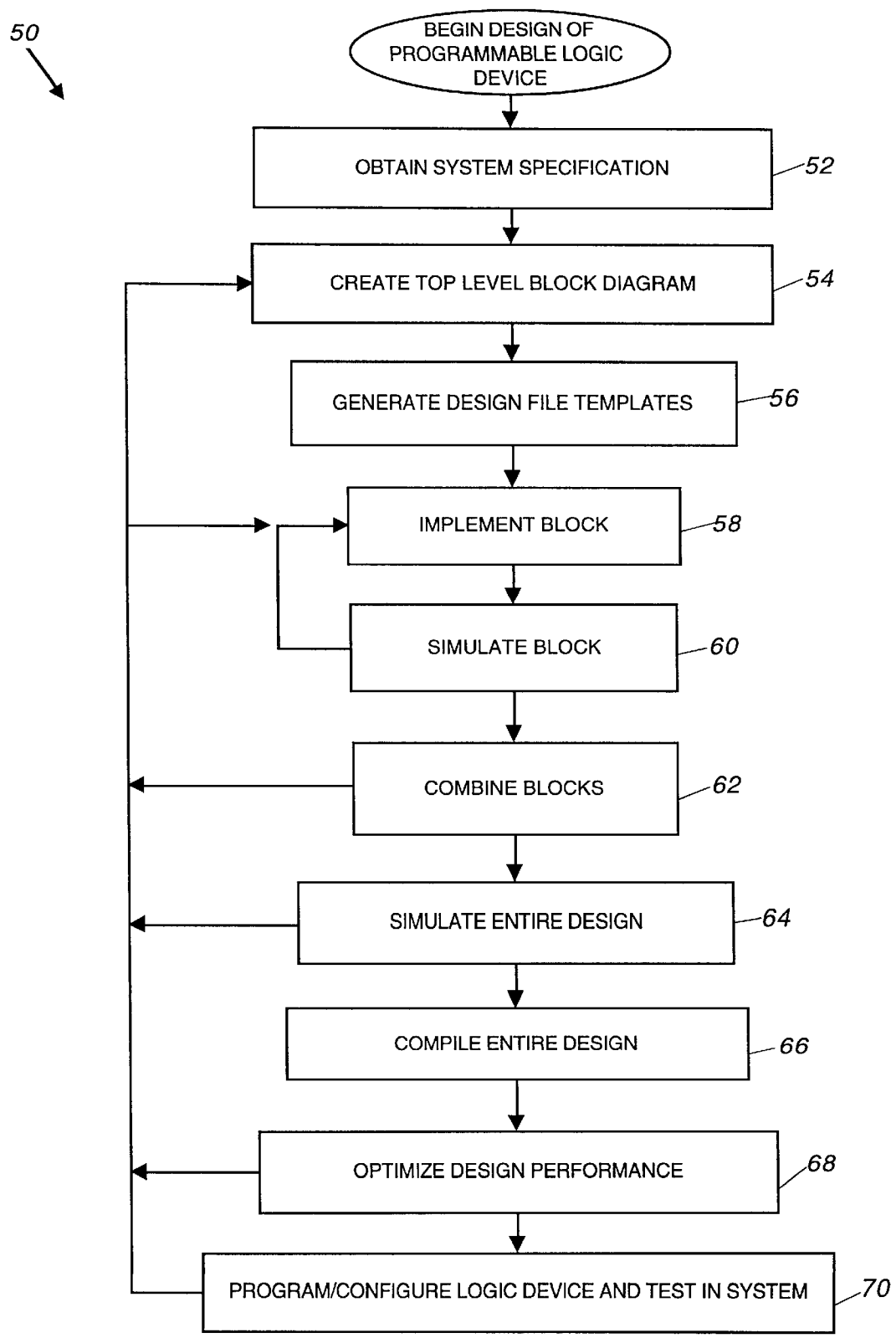
FIG. 2 is a flowchart of a design methodology used to design a programmable logic device according to one embodiment of the present invention.

FIG. 2 shows a design methodology 50 for using a system design specification in order to develop a design with which to program a PLD. It should be appreciated that the present invention may be practiced in the context of a wide variety of design methodologies. By way of example, the work group computing techniques and system of the present invention work well with an electronic design automation (EDA) software tool within the framework of the methodology of FIG. 2.

In step 52 a system specification for the PLD to be programmed is obtained. This specification is an external document or file that describes, for example, the device pin names, the functionality of each of the pins, the desired system functionality, timing and resource budgets, and the like. The multiple engineers within a work group will use this system specification in order to create a design with the EDA tool that will then be used to program a PLD.

Once the system specification is obtained, creation of a design using functional block diagrams is begun. In step 54 a top-level block diagram is created in which connections between lower-level designs blocks are specified. In this block, the target device, speed grade, and key timing requirements may be specified. Those skilled in the art will recognize that this top-level block may also include blocks that have already been developed or implemented or that have been obtained from a third party provider. This top level block may also be converted into an HDL file, or the like, for use in other related design tools, such as an external simulator.

Step 56 includes generating design file templates with the EDA tool for all blocks present in the top-level block diagram of step 54. After the designer has created a block which has not yet been implemented, the system may generate a design file template. Such templates may display a block in a window format including, for example, a title, a date, etc. around the boundaries. It may also include some details of the functional content depicted within the window. The design file templates may be in any specified design format including VHDL, AHDL, Verilog, block diagram, schematic, or other like format. In the case of a VHDL block the template may also include much of the formatting and necessary syntax for any VHDL block. The user need only take the template and add the small portion of VHDL syntax required to implement his function. For example, the user may need only add syntax defining a particular AND gate operation. Normal design, such VHDL or other IEEE standard, requires large amounts of text to adequately set up the design block.

Those skilled in the art will recognize that design file templates such as these can be used as starting points for the design of the structural or functional entities needed by the design. Thus, a design file template may serve as a reusable object for different instances of a block in one or more designs. More importantly, design file templates will be employed to reduce the amount of labor that the designer must expend to generate the logic in the blocks. In one embodiment, the generation of the design file templates is done in such a way that the templates can be updated later if the top-level block diagram changes.

Next, in step 58, each of the blocks of the top-level block is implemented using the EDA tool. It is noted that for more complicated designs, there may be additional levels of block diagrams (i.e., blocks within blocks). If changes are required at the top-level then the top-level block diagram is updated and the sub-designs are preferably automatically updated as well.

Furthermore, a block may be compiled through to a fitting stage for a particular integrated circuit die to provide information about resource utilization, timing performance, etc., as required for a given design. As such, it is envisioned that some timing optimization may be performed during step 58. This sequence illustrates a style of design in which an engineer first designs, then compiles and simulates, and then returns to design again if the simulation results are not satisfactory. In another style, an engineer may iterate through a number of design followed by simulation loops before finally compiling the complete design.

Concerning block implementation order, one or more of the following factors can be used to determine implementation order: (1) the complexity of a block; (2) the uncertainty or risk associated with a block; and/or (3) how far upstream and/or downstream in a given data-path the block resides. Each of steps 60, 62, 64, 68 and 70 may also lead back to this block implementation step for additional implementation necessitated by later changes in the design.

In step 60 a block is simulated functionally at the source level using a behavioral simulator and vectors generated by using a VHDL or Verilog test bench, for example. The simulation results can then be displayed or otherwise presented/recorded as waveforms, text or annotated onto the source files. The designer may also return to step 58 to implement a block again. Also, at this point a block may be compiled or a timing analysis performed.

Once the designer is satisfied with the simulation results, in step 62 the block is combined with other blocks and the resulting group is simulated together. In some cases, it may be useful to complete a full compilation to provide critical resource and timing information. Also, output simulation vectors from one block may become the input simulation vectors to the next block. The designer may also return to step 54 to modify the top-level block or to step 58 to implement a block again.

Next, in step 64, the entire design is simulated functionally at the source level using a behavioral simulator. Preferably, the top-level block diagram is fully specified before simulation and shows complete design connectivity. Vectors can be generated using a VHDL or Verilog test bench. Again, the simulation results can be displayed either as waveforms or annotated onto the source files. The designer may also return to step 54 to modify the top-level block or to step 58 to implement a block again. In step 66 the entire design is compiled through to a file containing the information needed to program a PLD to implement the user's design, such as to a "programming output file".

A wide variety of compile techniques may be used depending upon the type of design being created. By way of example, a few examples of compilation are presented below. For a PLD, compilation includes the steps of synthesis, place and route, generation of programming files and simulation. For a traditional integrated circuit design with a custom layout, compilation includes a layout version schematic, a design rule checker and simulations. For integrated circuit design using a high level design tool, compilation includes synthesis from a language such as VHDL or Verilog, automatic place and route and simulations. For printed circuit boards, compilation includes automatic routing, design rule checking, lumped parameter extraction and simulation. Of course, other types of compilation and variations on the above are possible.

Following compilation in step 66, in step 68 the timing checker inside the compiler is used to determine if the performance goals for the design have been met. Also, timing simulations are used to check performance details. In addition, other analysis tools such as a design profiler and/or layout editor can be used to further optimize the performance of the design. Preferably, optimization is not performed prior to step 68 because full compilation is usually required to establish the location of one or more critical paths within the design. The designer may also return to step 54 to modify the top-level block or to step 58 to implement a block again.

Next, in step 70 the device is programmed/configured using programming unit 14 and tested in the system. Again, the designer may also return to step 54 to modify the top-level block or to step 58 to implement a block again. While methodology 50 presents a top-down design process, it may also be used to support a bottom-up type methodology. Now that a general design methodology has been described by which an engineer may develop a design for a PLD, a technique for creating a design profile is disclosed that accurately calculates design profile information during compilation of a design.

Post-Extraction Information

Figure 3:
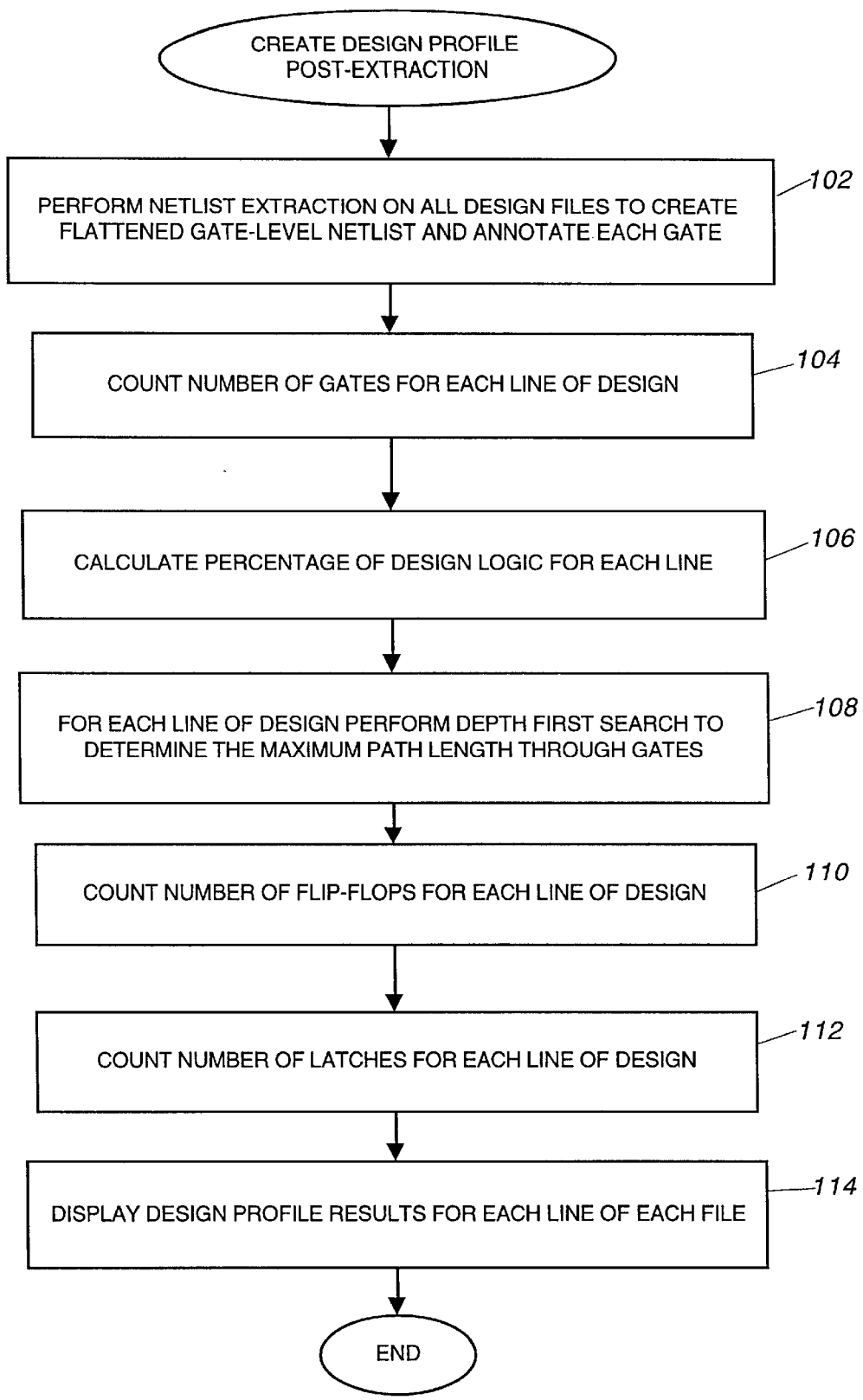
FIG. 3 is a flowchart describing one embodiment by which post-extraction utilization information is created for an electronic design.

FIG. 3 is a flowchart describing one embodiment by which post-extraction utilization information is created for an electronic design. In one specific embodiment, this information includes the percentage of the design's logic used, the maximum number of levels of logic, the number of flip-flops and the number of latches in the design, although other useful information may also be calculated.

In step 102 netlist extraction is performed on all design source files in order to create a flattened gate-level netlist. In this step, any hierarchy levels within the source files are substituted in to get the flattened netlist. Additionally, for this netlist of gates, each gate is annotated with the file and line number where it came from. Because a file may be instantiated in many places within a design hierarchy, the annotation includes in which instance of a file the gate came from. This annotation step flags each gate as coming from a particular line of source code, so that when logic cells are generated from these gates in synthesis, the logic cells can eventually be mapped back to individual lines of source code. A technique for performing this mapping when synthesized logic cells are present will be described below in FIG. 4.

Step 104 counts the number of gates produced by each line of source code in a file. Gates, levels, number of flip-flops may be counted in many of a number equivalent ways. In one specific embodiment of the invention, a number of counters are associated with each line of source code in an instance of a file. For example, there may be a gate counter, a level counter, a flip-flop counter, a latch counter, etc. As a pass is made through the netlist, each of the counters is incremented for appropriate gates encountered. Step 104 increments the gate counter for each line of source code as gates are produced in step 104 in order to produce a number of gates for each line. Gates may be counted using a variety of conventions. By way of example, a two-input gate equivalent standard may be used in which a two-input gate is used as a reference for counting; i.e., a four-input gate is counted as three two-input gates, etc.

Step 106 calculates the percentage of the design logic contributed to by each line of source code using the number of gates counted in step 104. The total design logic may be represented by the total number of gates in the design or by the total number of gates available in the PLD to be programmed.

Step 108 calculates the maximum number of levels of gate logic for each line of the design. For each line of the design, using the annotations from step 102, a netlist of gates is formed that correspond to each line. A depth first search is then performed for this netlist of gates (for each line of source code) to determine the maximum path length through this netlist of gates. For example, each node in the recursive depth first search records and stores its maximum depth, and the final maximum depth may be determined from the topmost node. This maximum depth corresponds to the maximum number of levels of gate logic for each line of source code in the design.

Step 110 counts the number of flip-flops per line of source code of the design as described in step 104. Step 112 counts the number of latches per line of source code of the design also as described in step 104. Step 114 displays the design profile results per line of source file. These results may be displayed alongside lines of source code in a text editor, in a graphic view of the design alongside symbols representing source code, or in other similar formats.

Post-Synthesis Information

Figure 4:
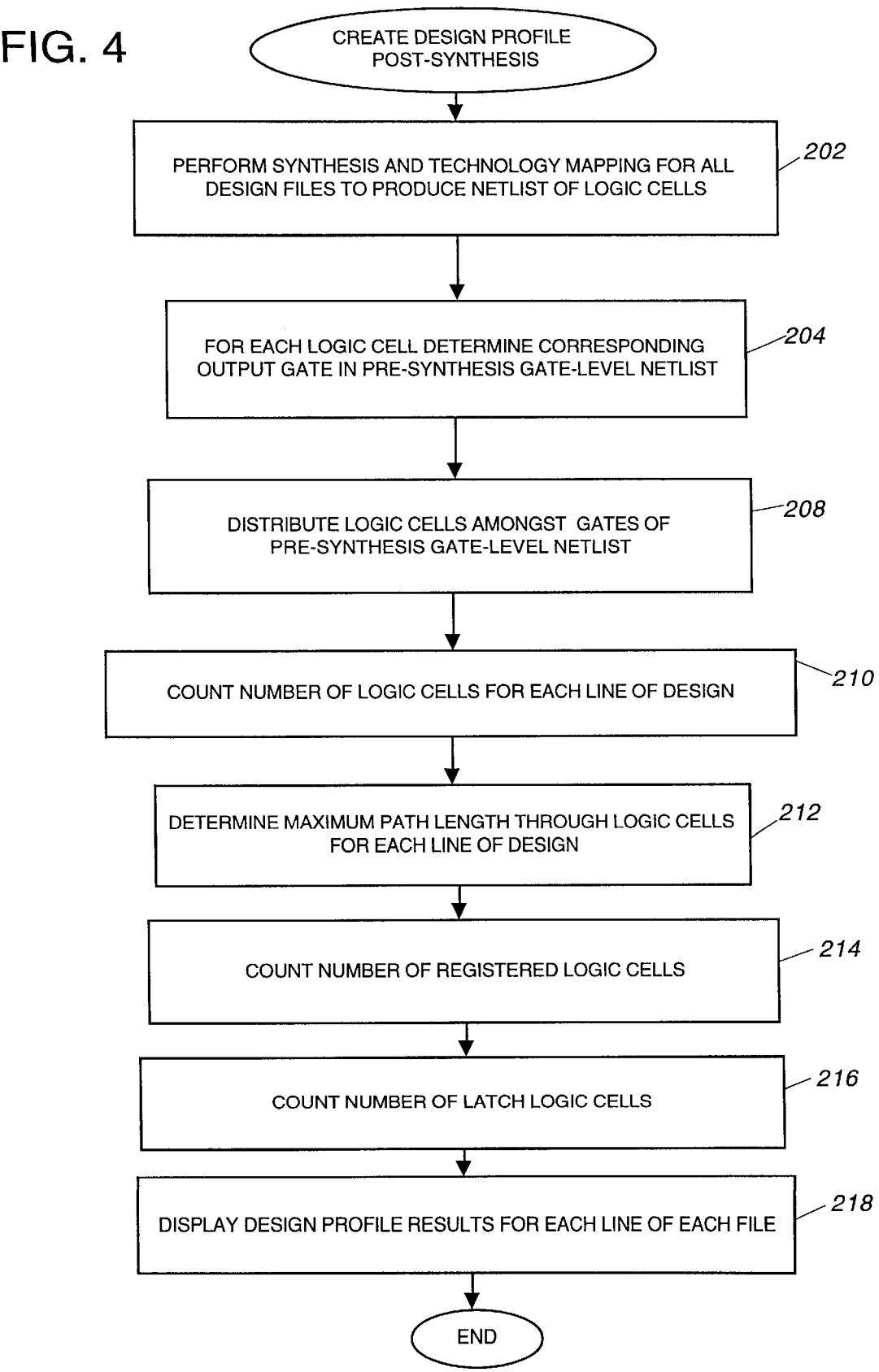
FIG. 4 is a flowchart describing one embodiment by which post-synthesis utilization information is created for an electronic design.

FIG. 4 is a flowchart describing one embodiment by which post-synthesis utilization information is created for an electronic design. In one specific embodiment, this information includes the number of logic cells, the maximum number of levels of logic cells, the number of registered logic cells and the number of "latch" logic cells, although other useful information may also be calculated.

Within the compilation of an electronic design, extraction, synthesis, technology mapping and other steps are performed. FIG. 4 discusses the synthesis and technology mapping steps within a compilation of an electronic design and how creation of a design profile may be achieved. Step 202 performs synthesis and technology mapping of all the design files to produce a netlist of logic cells. In general, a logic cell refers to the basic unit of the underlying technology that the technology mapping algorithm produces. Technology mapping maps gates produced earlier in compilation into the chosen logic cells. By way of example, a logic cell may be implemented as a four-input lookup table and a flip-flop, such as are used on the 8K family of devices available from Altera Corporation of San Jose, Calif. Logic cells may also be implemented using elements from a gate array or standard cell library.

During step 202, those logic cells that are synthesized (i.e., those logic cells not having corresponding gates in the post-extraction netlist) are flagged. A technique by which synthesized logic cells are flagged may be performed by keeping track of a pointer to the original gate as it is processed during logic synthesis. New gates created will not have this pointer and will thus be synthesized. Similarly, when the logical function a gate computes is changed, the pointer will be discarded so that gate will become a synthesized gate. At the conclusion of step 202 a netlist of logic cells is produced in which those logic cells that are synthesized are flagged.

Step 204 determines a corresponding output gate in the pre-synthesis gate-level netlist for each of the technology-mapped logic cells produced in step 202. That is, the gate in the gate-level netlist that produces the output signal for the logic cell is determined. Because each logic cell has a name (such as the pointer mentioned above) corresponding to the output signal it represents, it is straightforward to look backwards in the compilation process and determine the gate that produces this output signal. For those logic cells that are synthesized (e.g., synthesized macrocells), there are no corresponding gates in the pre-synthesis gate-level netlist.

Step 208 distributes a logic cell (or fractions thereof) amongst the gates in the gate-level netlist from which the particular logic cell was derived. It should be appreciated that many different techniques may be used to associate logic cells with gates that contribute to their creation. By way of example, the following technique is one specific technique for distributing logic cells among gates. Other similar techniques may be used. This step assigns the responsibility of creation of logic cells to particular gates. Through this assignment to gates, logic cells created can be related back to particular lines of source code. Preferably, the logic cells are assigned to gates such that the sum of all associated logic cells for all of the gates is equivalent to the actual number of logic cells in the electronic design. Of course, other similar counting techniques may be used that assign a relative number of logic cells to gates and still provide for feedback to a designer. As discussed above, logic cells are marked as synthesized or not in step 202. In one specific embodiment, distribution of logic cells is performed differently when synthesized cells are present.

Figure 5:
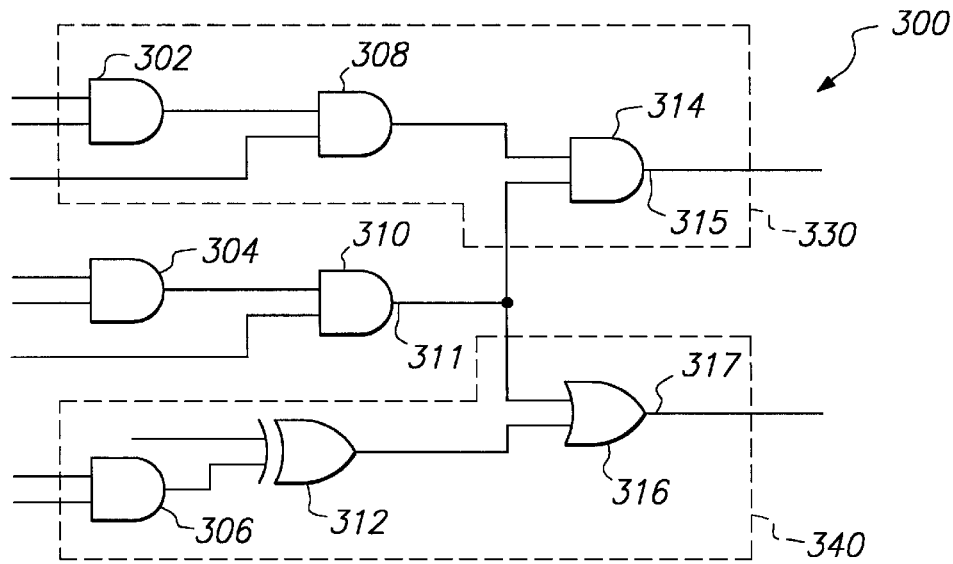
FIG. 5 illustrates a symbolic view of a post-extraction netlist of gates.

FIG. 5 illustrates a symbolic view of a netlist of gates 300 and will be used as an example of how step 208 may function for distribution of logic cells having corresponding output gates (i.e., no synthesized cells are present). Gates 300 include gates 302, 304, 306, 308, 310, 312, 314 and 316. Gate 310 has an output 311; gate 314 has an output 315; and gate 316 has an output 317.

Figure 6:
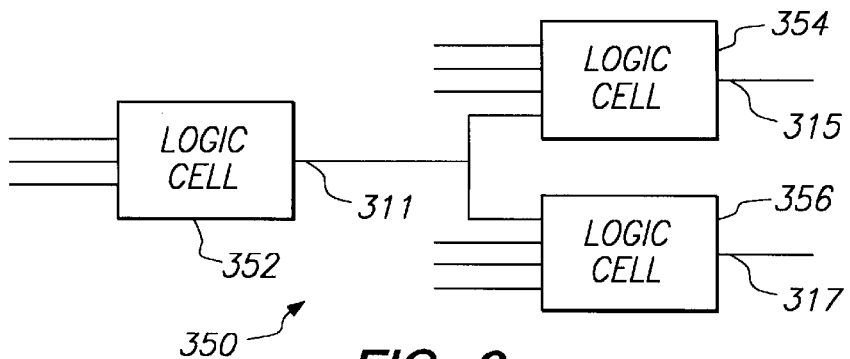
FIG. 6 illustrates a symbolic view of a netlist of logic cells that corresponds to a synthesis of the gates of FIG. 5.

FIG. 6 illustrates a symbolic view of a netlist of logic cells 350 that corresponds to a synthesis of gates 300. Cells 350 include logic cell 352, logic cell 354 and logic cell 356. Logic cell 352 has output 311, thus gate 310 is considered the "output gate" for logic cell 352. Logic cell 354 has output 315, thus gate 314 is considered the "output gate" for logic cell 354. Logic cell 356 has output 317, thus gate 316 is considered the "output gate" for logic cell 356.

FIGS. 5 and 6 will be used as a specific example to show how step 208 might function in a simple case for logic cells having corresponding output gates. In general, for each cell, regions of gates are identified in the gate netlist that correspond to each logic cell. First, the output gate that corresponds to the output of the logic cell is identified. For example, gate 314 is identified as the output gate corresponding to logic cell 354. Starting from (and including) this output gate, one works back along the inputs to this output gate through the gate netlist including upstream gates. All gates encountered are included in the region until either: another output gate corresponding to another logic cell is reached, a register is reached, or a primary input is reached. All gates encountered (not including other output gates and registers) are included in the region that corresponds to the non-leaky logic cell. In this example, region 330 corresponds to logic cell 354.

Finally, the logic cell is divided up among the gates in the identified region. In this example, each gate in region 330 is assigned ⅓ of logic cell 354. If there were four gates, they would each get ¼ of a logic cell, and so on. In this case all of the gates are 2-input gates and are thus treated equally. If some gates have more inputs than others, the larger gates may be apportioned a larger fraction of the logic cell. In a similar fashion, region 340 is identified as corresponding to logic cell 356. Also gates 304 and 310 would form a region corresponding to logic cell 352. In this fashion, logic cells are assigned to gates.

Figure 7:
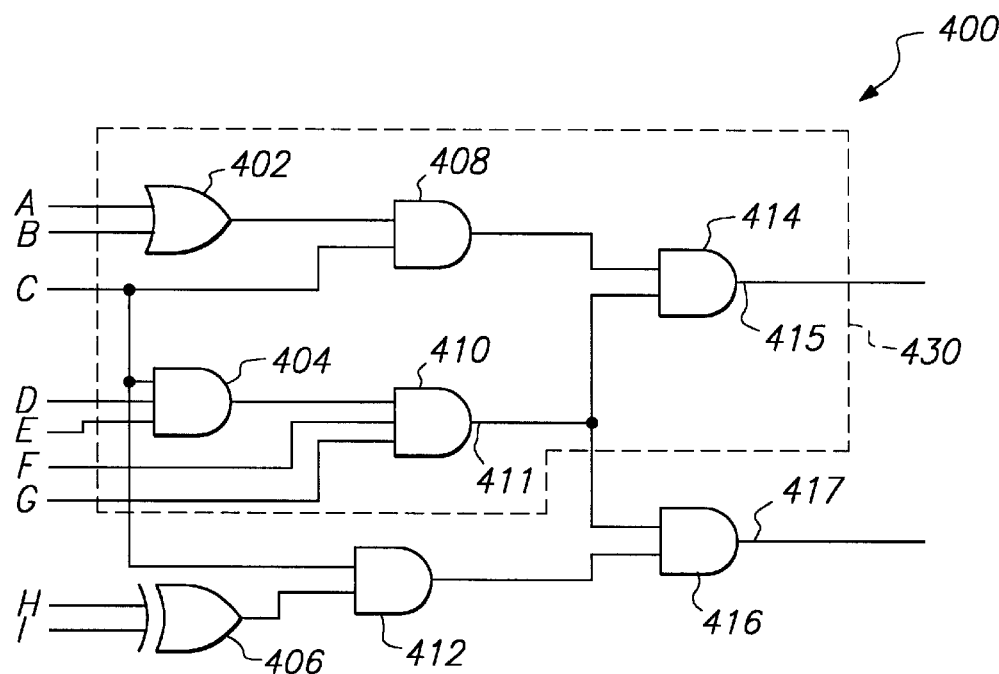
FIG. 7 illustrates a symbolic view of a post-extraction netlist of gates.
Figure 8:
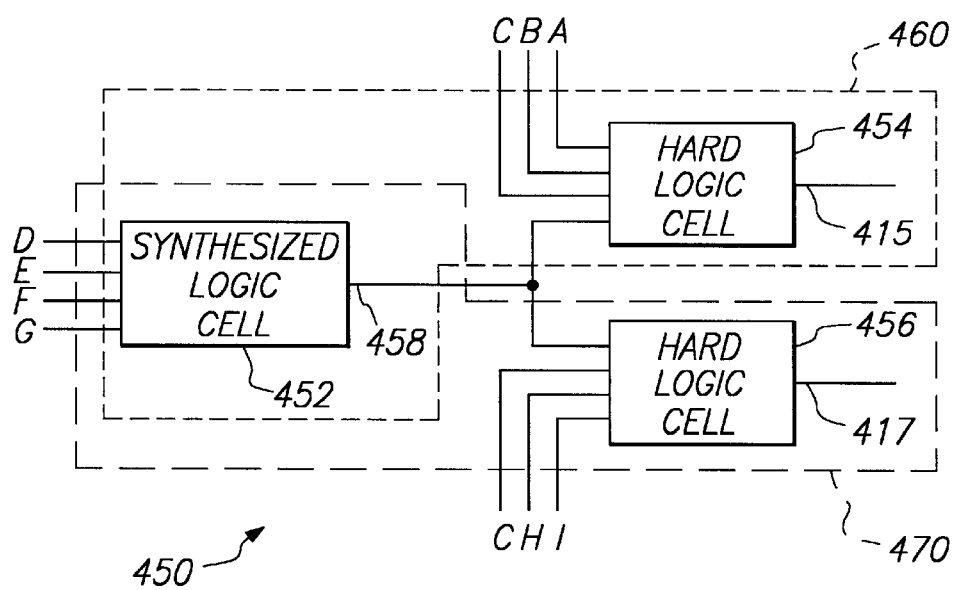
FIG. 8 illustrates a symbolic view of a netlist of logic cells that corresponds to a synthesis of the gates of FIG. 7.

FIGS. 7 and 8 illustrate an example of how regions are identified in a gate netlist having synthesized and non-synthesized (or "hard") logic cells. In this specific embodiment, these regions are determined as follows, although other similar techniques may also be used. FIG. 7 illustrates a symbolic view of a netlist of gates 400 and will be used as an example of how step 208 may function for distribution of synthesized logic cells. Gates 400 include gates 402, 404, 406, 408, 410, 412, 414 and 416. Gate 410 has an output 411; gate 414 has an output 415; and gate 416 has an output 417. FIG. 8 illustrates a symbolic view of a netlist of logic cells 450 that corresponds to a synthesis of gates 400. Cells 450 include synthesized logic cell 452, hard logic cell 454 and hard logic cell 456. Synthesized logic cell 452 has output 458 which does not correspond to any gate in netlist 400. In particular, it does not correspond to gate 410 output 411 since input pin C feeding to gate 404 has been removed during logic synthesis. Logic cell 454 has output 415, thus gate 414 is considered the "output gate" for logic cell 454. Logic cell 456 has output 417, thus gate 416 is considered the "output gate" for logic cell 456.

Once these output gates in gate netlist 400 are identified, regions around each synthesized logic cell are formed within the logic cell netlist. These regions may be overlapping. First, logic cells having corresponding output gates ("hard" logic cells) are identified in the netlist. (Another way to look at it is to identify a synthesized logic cell and then identify the next downstream hard logic cell). Starting from (and including) a hard logic cell, one works back along the netlist of logic cells, past (and including) any encountered synthesized logic cells. This region continues until either a hard logic cell is reached or an input pin is reached. The hard logic cell reached is not included in the region. In this example, region 460 includes cells 454 and 452. Region 470 includes cells 456 and also cell 452. Note that a synthesized logic cell may be in more than one group.

Once groups of logic cells are formed, the number of logic cells in each group are counted. Cells that are found in more than one group contribute a corresponding fraction of a logic cell to that group. In this example, cell 452 is in two groups, and thus only contributes ½ a logic cell to each of groups 460 and 470. Thus, group 460 includes 1½ logic cells and group 470 includes 1½ logic cells. Thus, groups of logic cells may be formed in this fashion.

Once groups of logic cells are formed around synthesized logic cells, regions of gates in the gate netlist are formed corresponding to these groups of logic cells. The output gates for each logic cell may be identified in an earlier step or at this point. In this example, gate 414 is considered the "output gate" for hard logic cell 454. To identify a region of gates corresponding to region 460 of logic cells, one first identifies the output gate for this region which is gate 414. The gates upstream of gate 414 are traversed and included in the region until either an input is reached or a hard output gate is encountered (i.e., an output gate that corresponds to the output of a hard logic cell). The encountered gate is not included in the region. In this example, region 430 in netlist 400 corresponds to region 460 of logic cells 450. In a similar fashion, gates 404, 406, 410, 412 and 416 would form a region of gates that correspond to region 470 of logic cells.

Once a region of gates (such as region 430) is identified that corresponds to a group of logic cells, the number of logic cells in the group are divided up among the number of gates in the region. For example, if there are 2⅓ logic cells in a group (the ⅓ due to a single logic cell being shared with two other groups), and there are 7 gates in the corresponding region of gates, then each gate is assigned ⅓ of a logic cell. In this specific example, there are 1½ logic cells in group 460, and 5 gates in corresponding region 430. The 1½ logic cells are distributed among the 5 gates by dividing the number of gates (5) into the number of logic cells (1½). In this example, each gate would be assigned 0.30 of a logic cell.

Step 210 then determines the number of combinatorial logic cells created by each line of source code by noting which gates correspond to a given line of source code, and then counting up all of the combinatorial logic cells distributed to those gates in step 208. A combinatorial logic cell makes no use of a register or latch, and may be synthesized or hard.

Step 212 determines the maximum path length through logic cells for a particular line of code in order to determine the maximum number of levels of logic cells for each line. Using the annotation on gates to determine to which logic cells gates correspond, a set of logic cells are identified that are the result of a line of source code. Next, a depth-first search is performed from the final output logic cell in order to determine the maximum depth of logic cells for the line of source code. The search ends upstream at a logic cell that did not contribute to the line of source code. This step may be performed as described in step 108, or in any similar fashion. In one embodiment, if a logic cell is contributed to in any amount by a line of source code, then that logic cell is considered as being in the delay path of that line of source code.

Step 214 counts the number of registered logic cells (flip-flops) per line of source code that are actually being used in the design, i.e., those logic cells having flip-flops not being used in the design are not counted. This step may be performed as described in step 210 above, except in this case only logic cells having flip-flops are counted as contributing toward a line of source code.

A variety of conventions may be used to identify registered logic cells that correspond to a line of source code. In one embodiment, if a flip-flop is present by itself in the gate netlist, then the corresponding logic cell that implements this flip-flop is marked as coming from the line of source code that created the flip-flop in the gate netlist, even though other lines may have also contributed to the logic cell containing the flip-flop. In a specific embodiment, if flip-flops are merged, then each line of source code gets a fraction of the logic cell that implements the merged flip-flops. For example, if two lines of source code each create a flip-flop, but these two flip-flops are merged into one logic cell, then each line of source gets assigned ½ of a registered logic cell.

Step 216 counts the number of latch logic cells per line of source code that are actually being used in the design, i.e., those logic cells having latches not being used in the design are not counted. This step may be performed as described in step 210 above, except in this case only logic cells having latches are counted as contributing toward a line of source code. A variety of analyses may be performed to identify latches in the logic cell netlist. For example, a multiplexer may be a latch if it feeds back upon itself; this type of latch is identified during synthesis.

Step 218 then displays these design profile results for each line of source code. These results may be displayed alongside lines of source code in a text editor, in a graphic view of the design alongside symbols representing source code, or in other similar formats.

Computer System Embodiment

Figure 9:
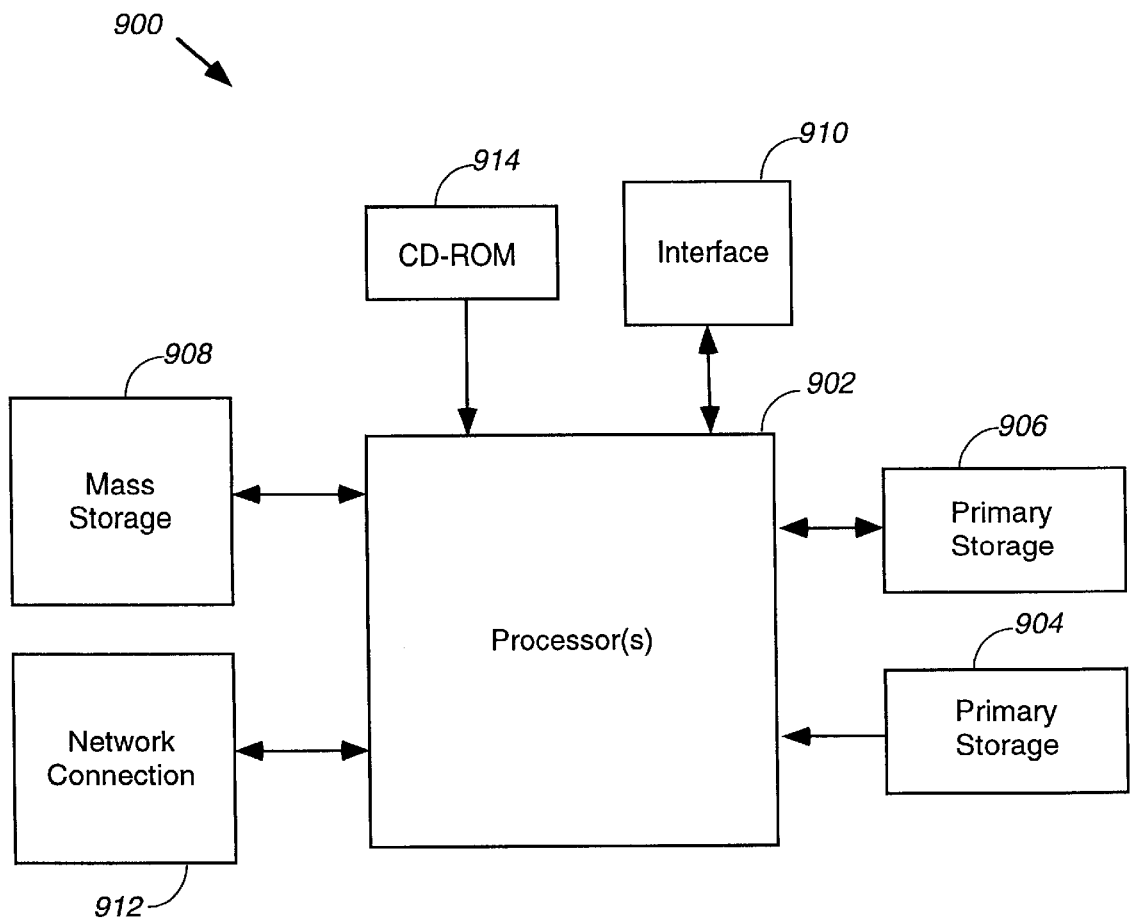
FIG. 9 is a block diagram of a typical computer system suitable for implementing an embodiment of the present invention.

FIG. 9 illustrates a computer system 900 in accordance with an embodiment of the present invention. Computer system 900 includes any number of processors 902 (also referred to as central processing units, or CPUs) that are coupled to storage devices including primary storage 906 (such as random access memory, or RAM) and primary storage 904 (such as a read only memory, or ROM). As is well known in the art, primary storage 904 acts to transfer data and instructions uni-directionally to the CPU and primary storage 906 is used typically to transfer data and instructions in a bi-directional manner. Both of these primary storage devices may include any suitable of the computer-readable media described below. A mass storage device 908 is also coupled bi-directionally to CPU 902 and provides additional data storage capacity and may also include any of the computer-readable media described below. Mass storage device 908 may be used to store programs, data and the like and is typically a secondary storage medium (such as a hard disk) that is slower than primary storage. It will be appreciated that the information retained within mass storage device 908, may, in appropriate cases, be incorporated in standard fashion as part of primary storage 906 as virtual memory. A specific mass storage device such as a CD-ROM 914 passes data uni-directionally to the CPU.

CPU 902 is also coupled to an interface 910 that includes one or more input/output devices such as such as video monitors, track balls, mice, keyboards, microphones, touch sensitive displays, transducer card readers, magnetic or paper tape readers, tablets, styluses, voice or handwriting recognizers, biometrics readers, or other computers. CPU 902 optionally may be coupled to another computer or telecommunications network using a network connection as shown generally at 912. With such a network connection, it is contemplated that the CPU might receive information from the network, or might output information to the network in the course of performing the above-described method steps.

In addition, embodiments of the present invention further relate to computer storage products with a computer readable medium that have program code thereon for performing various computer-implemented operations. The media and program code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, the present invention is applicable for providing utilization information for a wide variety of PLDs, and logic cells that are counted may be of any type. And although one particular technique for compilation has been provided, the present invention is applicable with a wide variety of compilation techniques that enable synthesized logic cells to be created and flagged. Also, any suitable post-extraction gate-level netlist may be used. Furthermore, other conventions for counting and distributing logic cells among source code may be used. In addition, other similar techniques may be used to group logic cells into regions that include a synthesized logic cell. Therefore, the described embodiments should be taken as illustrative and not restrictive, and the invention should not be limited to the details given herein but should be defined by the following claims and their full scope of equivalents.

I claim:

1. A computer-implemented method of providing utilization information to a designer of an electronic design for a PLD, said method comprising:

generating a post-extraction netlist for said electronic design that includes a plurality of technology-independent gates;

synthesizing said post-extraction netlist to produce a post-synthesis netlist of logic cells, said netlist of logic cells including a plurality of synthesized logic cells;

marking said synthesized logic cells as being synthesized;

distributing said netlist of logic cells among said post-extraction netlist of technology-independent gates, said synthesized logic cells being thereby distributed among said technology-independent gates; and providing utilization information to said designer based upon said distribution of said netlist of logic cells among said post-extraction netlist of technology-independent gates, said utilization information corresponding to a line of source code of said electronic design.

2. A method as recited in claim 1 wherein each of said synthesized logic cells has an output that does not correspond to any of said technology-independent gates of said post-extraction netlist.

3. A method as recited in claim 1 further comprising:

grouping said logic cells into regions such that each of said regions that includes one of said synthesized logic cells includes at least one hard logic cell, whereby synthesized logic cells are taken into account during said distributing step.

4. A method as recited in claim 1 wherein said step of distributing said netlist of logic cells includes the sub-step of:

distributing said netlist of logic cells among said post-extraction netlist of technology-independent gates such that the sum of all logic cells associated with said technology-independent gates is equal to the number of logic cells utilized in said electronic design.

5. A method as recited in claim 1 wherein said step of providing utilization information to said designer includes the sub-step of:

providing information including the number of combinatorial logic cells, the number of registered logic cells and the number of latch logic cells.

6. A method as recited in claim 1 further comprising:

calculating the maximum path length through a subset of said logic cells corresponding to a subset of said technology-independent gates, said subset of said technology-independent gates corresponding to a line of source code of said electronic design; and providing to said designer a timing delay for said line of source code based upon said calculated maximum path length, whereby said synthesized logic cells are taken into account in determining said timing delay for said line of source code.

7. A computer-implemented method of determining the number of logic cells associated with a line of source code of an electronic design for a PLD, said method comprising:

compiling said electronic design including said line of source code to produce a gate-level netlist having a plurality of technology-independent gates and a post-synthesis netlist having a plurality of logic cells;

creating a plurality of synthesized logic cells during said compiling, said synthesized logic cells included in said plurality of logic cells;

distributing said plurality of logic cells among said plurality of gates, said synthesized logic cells being thereby distributed among said plurality of gates; and determining a subset of said plurality of gates that correspond to said line of source code; and summing the number of logic cells distributed to said subset of said plurality of gates, thereby determining the number of logic cells associated with said line of source code.

8. A method as recited in claim 7 wherein each of said synthesized logic cells has an output that does not correspond to any of said gates of said gate-level netlist.

9. A method as recited in claim 7 further comprising:

grouping said logic cells into regions such that each of said regions that includes one of said synthesized logic cells includes at least one hard logic cell, whereby synthesized logic cells are taken into account during said distributing step.

10. A method as recited in claim 7 wherein said step of distributing said plurality of logic cells includes the sub-step of:

distributing said plurality of logic cells among said plurality of gates such that the sum of all logic cells associated with said gates is equal to the number of logic cells utilized in said electronic design.

11. A method as recited in claim 7 wherein said step of summing the number of logic cells includes the sub-steps of:

summing the number of combinatorial logic cells;

summing the number of registered logic cells; and summing the number of latch logic cells, whereby the number of combinatorial, registered and latch logic cells associated with said line of source code may be determined.

12. A method as recited in claim 7 further comprising:

calculating the maximum path length through a subset of said logic cells corresponding to said subset of said plurality of gates, said subset of said plurality of gates corresponding to said line of source code of said electronic design; and providing to said designer a timing delay for said line of source code based upon said calculated maximum path length, whereby said synthesized logic cells are taken into account in determining said timing delay for said line of source code.

13. A computer-implemented method of providing the number of logic cells associated with a line of source code of an electronic design for a PLD, said method comprising:

compiling said electronic design including said line of source code to produce a gate-level netlist having a plurality of technology-independent gates and a post-synthesis netlist having a plurality of logic cells, said plurality of logic cells including a plurality of synthesized logic cells and a plurality of hard logic cells created during said compiling;

grouping said logic cells into regions such that each of said regions that includes one of said synthesized logic cells includes at least one hard logic cell;

determining a number of logic cells contributing to each of said regions taking into account overlapping regions;

distributing said number of logic cells for each of said regions of said post-synthesis netlist among corresponding regions in said plurality of gates; and providing a final number of logic cells associated with said line of source code to said designer based upon said distribution of said number of logic cells for each of said regions of said post-synthesis netlist among corresponding regions in said plurality of gates.

14. A method as recited in claim 13 wherein each of said synthesized logic cells has an output that does not correspond to any of said gates of said gate-level netlist, and each of said hard logic cells has an output that does correspond to a gate of said gate-level netlist.

15. A method as recited in claim 13 wherein said step of grouping said logic cells into regions includes the sub-step of:

identifying a first hard logic cell in said post-synthesis netlist as belonging to a first region; and traversing the inputs to said first hard logic cell and including synthesized logic cells in said first region until either a hard logic cell is reached or an input pin is reached, whereby a first region of logic cells is identified that is one of said regions.

16. A method as recited in claim 13 wherein said step of distributing said number of logic cells includes the sub-step of:

distributing said number of logic cells for each of said regions of said post-synthesis netlist among corresponding regions in said plurality of gates such that the sum of all logic cells associated with said plurality of gates is equal to the number of logic cells utilized in said electronic design.

17. A method as recited in claim 13 wherein said step of providing a final number of logic cells includes the sub-steps of:

summing the number of combinatorial logic cells;

summing the number of registered logic cells; and summing the number of latch logic cells, whereby the number of combinatorial, registered and latch logic cells associated with said line of source code may be determined.

18. A method as recited in claim 13 further comprising:

calculating the maximum path length through a subset of said logic cells corresponding to a subset of said plurality of gates, said subset of said plurality of gates corresponding to said line of source code of said electronic design; and providing to said designer a timing delay for said line of source code based upon said calculated maximum path length, whereby said synthesized logic cells are taken into account in determining said timing delay for said line of source code.

19. A computer-implemented method of determining a timing delay associated with a line of source code of an electronic design for a PLD, said method comprising:

compiling said electronic design including said line of source code to produce a gate-level netlist having a plurality of technology-independent gates and a post-synthesis netlist having a plurality of logic cells;

creating a plurality of synthesized logic cells during said compiling, said synthesized logic cells included in said plurality of logic cells;

distributing said plurality of logic cells among said plurality of gates, said synthesized logic cells being thereby distributed among said plurality of gates; and determining a subset of said logic cells that correspond to said line of source code; and determining the maximum signal path length through said subset of said logic cells to provide a representation of said timing delay, whereby said synthesized logic cells are taken into account in determining said timing delay associated with said line of source code.

20. A method as recited in claim 19 wherein each of said synthesized logic cells has an output that does not correspond to any of said gates of said gate-level netlist.

21. A method as recited in claim 19 further comprising:

grouping said logic cells into regions such that each of said regions that includes one of said synthesized logic cells includes at least one hard logic cell, whereby synthesized logic cells are taken into account during said distributing step.

22. A method as recited in claim 19 wherein said step of distributing said plurality of logic cells includes the sub-step of:

distributing said plurality of logic cells among said plurality of gates such that the sum of all logic cells associated with said gates is equal to the number of logic cells utilized in said electronic design.

23. A computer-readable medium comprising computer code for providing utilization information to a designer of an electronic design for a PLD, said computer code of said computer-readable medium effecting the following:

generating a post-extraction netlist for said electronic design that includes a plurality of technology-independent gates;

synthesizing said post-extraction netlist to produce a post-synthesis netlist of logic cells, said netlist of logic cells including a plurality of synthesized logic cells;

marking said synthesized logic cells as being synthesized;

distributing said netlist of logic cells among said post-extraction netlist of technology-independent gates, said synthesized logic cells being thereby distributed among said technology-independent gates; and providing utilization information to said designer based upon said distribution of said netlist of logic cells among said post-extraction netlist of technology-independent gates, said utilization information corresponding to a line of source code of said electronic design.

24. A computer-readable medium as recited in claim 23 wherein each of said synthesized logic cells has an output that does not correspond to any of said technology-independent gates of said post-extraction netlist.

25. A computer-readable medium as recited in claim 23 further comprising computer code for:

grouping said logic cells into regions such that each of said regions that includes one of said synthesized logic cells includes at least one hard logic cell, whereby synthesized logic cells are taken into account during said distributing step.

26. A computer-readable medium as recited in claim 23 wherein said computer code for distributing said netlist of logic cells includes computer code for:

distributing said netlist of logic cells among said post-extraction netlist of technology-independent gates such that the sum of all logic cells associated with said technology-independent gates is equal to the number of logic cells utilized in said electronic design.

27. A computer-readable medium as recited in claim 23 wherein said computer code for providing utilization information to said designer includes computer code for:
providing information including the number of combinatorial logic cells, the number of registered logic cells and the number of latch logic cells.

28. A computer-readable medium as recited in claim 23 further comprising computer code for:
calculating the maximum path length through a subset of said logic cells corresponding to a subset of said technology-independent gates, said subset of said technology-independent gates corresponding to a line of source code of said electronic design; and
providing to said designer a timing delay for said line of source code based upon said calculated maximum path length, whereby said synthesized logic cells are taken into account in determining said timing delay for said line of source code.

29. A computer-readable medium comprising computer code for determining the number of logic cells associated with a line of source code of an electronic design for a PLD, said computer code of said computer-readable medium effecting the following:
compiling said electronic design including said line of source code to produce a gate-level netlist having a plurality of technology-independent gates and a post-synthesis netlist having a plurality of logic cells;
creating a plurality of synthesized logic cells during said compiling, said synthesized logic cells included in said plurality of logic cells;
distributing said plurality of logic cells among said plurality of gates, said synthesized logic cells being thereby distributed among said plurality of gates; and
determining a subset of said plurality of gates that correspond to said line of source code; and
summing the number of logic cells distributed to said subset of said plurality of gates, thereby determining the number of logic cells associated with said line of source code.

30. A computer-readable medium as recited in claim 29 wherein each of said synthesized logic cells has an output that does not correspond to any of said gates of said gate-level netlist.

31. A computer-readable medium as recited in claim 29 further comprising computer code for:
grouping said logic cells into regions such that each of said regions that includes one of said synthesized logic cells includes at least one hard logic cell, whereby synthesized logic cells are taken into account during said distributing step.

32. A computer-readable medium as recited in claim 29 wherein said computer code for distributing said plurality of logic cells includes computer code for:
distributing said plurality of logic cells among said plurality of gates such that the sum of all logic cells associated with said gates is equal to the number of logic cells utilized in said electronic design.

33. A computer-readable medium as recited in claim 29 wherein said computer code for summing the number of logic cells includes computer code for:
summing the number of combinatorial logic cells;
summing the number of registered logic cells; and
summing the number of latch logic cells, whereby the number of combinatorial, registered and latch logic cells associated with said line of source code may be determined.

34. A computer-readable medium as recited in claim 29 further comprising computer code for:
calculating the maximum path length through a subset of said logic cells corresponding to said subset of said plurality of gates, said subset of said plurality of gates corresponding to said line of source code of said electronic design; and
providing to said designer a timing delay for said line of source code based upon said calculated maximum path length, whereby said synthesized logic cells are taken into account in determining said timing delay for said line of source code.

35. A computer-readable medium comprising computer code for providing the number of logic cells associated with a line of source code of an electronic design for a PLD, said computer code of said computer-readable medium effecting the following:
compiling said electronic design including said line of source code to produce a gate-level netlist having a plurality of technology-independent gates and a post-synthesis netlist having a plurality of logic cells, said plurality of logic cells including a plurality of synthesized logic cells and a plurality of hard logic cells created during said compiling;
grouping said logic cells into regions such that each of said regions that includes one of said synthesized logic cells includes at least one hard logic cell;
determining a number of logic cells contributing to each of said regions taking into account overlapping regions;
distributing said number of logic cells for each of said regions of said post-synthesis netlist among corresponding regions in said plurality of gates; and
providing a final number of logic cells associated with said line of source code to said designer based upon said distribution of said number of logic cells for each of said regions of said post-synthesis netlist among corresponding regions in said plurality of gates.

36. A computer-readable medium as recited in claim 35 wherein each of said synthesized logic cells has an output that does not correspond to any of said gates of said gate-level netlist, and each of said hard logic cells has an output that does correspond to a gate of said gate-level netlist.

37. A computer-readable medium as recited in claim 35 wherein said computer code for grouping said logic cells into regions includes computer code for:
identifying a first hard logic cell in said post-synthesis netlist as belonging to a first region; and
traversing the inputs to said first hard logic cell and including synthesized logic cells in said first region until either a hard logic cell is reached or an input pin is reached, whereby a first region of logic cells is identified that is one of said regions.

38. A computer-readable medium as recited in claim 35 wherein said computer code for distributing said number of logic cells includes computer code for:
distributing said number of logic cells for each of said regions of said post-synthesis netlist among corresponding regions in said plurality of gates such that the sum of all logic cells associated with said plurality of gates is equal to the number of logic cells utilized in said electronic design.

39. A computer-readable medium as recited in claim 35 wherein said computer code for providing a final number of logic cells includes computer code for:

summing the number of combinatorial logic cells;

summing the number of registered logic cells; and summing the number of latch logic cells, whereby the number of combinatorial, registered and latch logic cells associated with said line of source code may be determined.

40. A computer-readable medium as recited in claim 35 further comprising computer code for:

calculating the maximum path length through a subset of said logic cells corresponding to a subset of said plurality of gates, said subset of said plurality of gates corresponding to said line of source code of said electronic design; and providing to said designer a timing delay for said line of source code based upon said calculated maximum path length, whereby said synthesized logic cells are taken into account in determining said timing delay for said line of source code.

41. A computer-readable medium comprising computer code for determining a timing delay associated with a line of source code of an electronic design for a PLD, said computer code of said computer-readable medium effecting the following:

compiling said electronic design including said line of source code to produce a gate-level netlist having a plurality of technology-independent gates and a post-synthesis netlist having a plurality of logic cells;

creating a plurality of synthesized logic cells during said compiling, said synthesized logic cells included in said plurality of logic cells;

distributing said plurality of logic cells among said plurality of gates, said synthesized logic cells being thereby distributed among said plurality of gates; and determining a subset of said logic cells that correspond to said line of source code; and determining the maximum signal path length through said subset of said logic cells to provide a representation of said timing delay, whereby said synthesized logic cells are taken into account in determining said timing delay associated with said line of source code.

42. A computer-readable medium as recited in claim 41 wherein each of said synthesized logic cells has an output that does not correspond to any of said gates of said gate-level netlist.

43. A computer-readable medium as recited in claim 41 further comprising computer code for:

grouping said logic cells into regions such that each of said regions that includes one of said synthesized logic cells includes at least one hard logic cell, whereby synthesized logic cells are taken into account during said distributing step.

44. A computer-readable medium as recited in claim 41 wherein said computer code for distributing said plurality of logic cells includes computer code for:

distributing said plurality of logic cells among said plurality of gates such that the sum of all logic cells associated with said gates is equal to the number of logic cells utilized in said electronic design.

* * * * *